United States Patent [19]
Emmons et al.

[11] Patent Number: 5,294,728
[45] Date of Patent: Mar. 15, 1994

[54] LATENT THIOL MERCAPTAN CHAIN TRANSFER AGENTS AND THEIR USE IN THE SYNTHESIS OF POLYMERS

[75] Inventors: William D. Emmons, Huntingdon Valley; Andrew W. Gross, Hatboro, both of Pa.

[73] Assignee: Rohm and Haas Company, Philadelphia, Pa.

[21] Appl. No.: 787,280

[22] Filed: Nov. 4, 1991

[51] Int. Cl.$^5$ .................... C07C 67/02; C08F 8/00; C08F 12/30

[52] U.S. Cl. .................... 558/255; 526/213; 526/214; 526/222; 526/224; 526/286; 526/287; 526/303.1; 526/315; 526/317.1; 526/319; 525/191; 525/221; 525/222; 525/231; 525/238; 525/241; 560/1; 560/9

[58] Field of Search .................... 560/1, 9; 558/255

[56] References Cited

U.S. PATENT DOCUMENTS

| | | | |
|---|---|---|---|
| 4,565,854 | 1/1986 | Sato et al. | 526/214 |
| 4,659,788 | 4/1987 | Ohta et al. | 525/518 |
| 4,699,950 | 10/1987 | Sato et al. | 525/185 |
| 4,788,127 | 11/1988 | Bailey et al. | 430/192 |

*Primary Examiner*—John Kight, III
*Assistant Examiner*—T. Mosley
*Attorney, Agent, or Firm*—James G. Vouros

[57] ABSTRACT

This invention relates to latent thiol mercaptan chain transfer agents and their use in the synthesis of polymers. In addition, this invention relates to novel polymers and block copolymers formed using these latent thiol mercaptan chain transfer agents.

3 Claims, No Drawings

LATENT THIOL MERCAPTAN CHAIN TRANSFER AGENTS AND THEIR USE IN THE SYNTHESIS OF POLYMERS

FIELD OF THE INVENTION

This invention relates to latent thiol mercaptan chain transfer agents and their use in the synthesis of polymers. In addition, this invention relates to novel polymers and block copolymers formed using these latent thiol mercaptan chain transfer agents.

BACKGROUND OF THE INVENTION

"Latent thiol mercaptan chain transfer agent," as used herein, is defined as compounds containing at least one thiol group and at least one protected thiol group. During use in a polymerization, the at least one thiol group reacts with a polymer chain being formed from at least one first ethylenically unsaturated monomer. This yields a polymer chain containing at least one protected thiol group, primarily at the terminal portion of the chain. This polymer formed can be used as is, or can be reacted further.

The term "latent" refers to the fact that the protected thiol group does not react with the first ethylenically unsaturated monomer or monomers, but after the polymerization is conducted, the protected thiol group can be deprotected, for example by a cleaving reaction, to yield a terminal thiol group on the polymer chain. These terminal thiol groups can then react further, for example with at least one second ethylenically unsaturated monomer, forming a block copolymer.

"Block copolymers" as used herein are defined as the "linear" macromolecules formed by attachment of different polymers or copolymers at their ends. The term linear as used herein, includes molecules which are perfectly linear and also those bearing side chains but are still predominantly linear. Due to the ability to chemically combine unlike polymeric segments in one molecule, block copolymers have unique properties, making them particularly useful for their surface active properties, such as for example in stabilizing physical blends of otherwise incompatible polymeric or monomeric compounds.

The block copolymer products of the present invention can be used directly in water-based emulsion coatings, elastomers, adhesives, caulks and mastics. Still further uses for these copolymers are as plastic additives for use as compatibilizers of polymer-polymer blends.

DESCRIPTION OF THE PRIOR ART

U.S. Pat. Nos. 4,565,854 and 4,699,950 disclose a nonaqueous process for the formation of a polymer with terminal thiol groups and its use in forming block copolymers. Initially, a polymer is obtained by polymerizing at least one monomer capable of radical polymerization in the presence of a thiolcarboxylic acid. The thiolcarboxylic acid works as a chain transfer agent, with the thiol portion of the thiolcarboxylic acid reacting at the end of the polymer to form a thiolcarboxylic acid ester. Upon subjecting the polymer to alkali or acid, the thiolcarboxylic acid ester is decomposed, leaving a polymer with terminal thiol groups. This polymer can then react, via the thiol end groups, with vinyl monomers to form subsequent block copolymers via an aqueous solution polymerization. However, the aqueous solution polymerization suffers from the drawback of forming solutions with low solids content when polymers with high molecular weights are prepared. Another problem with this technique is that it is not an efficient process because thiolcarboxylic acids suffer from poor chain transfer efficiency.

Thiolacetic acid ($CH_3COSH$) has been found to be inefficient as a chain transfer agent and is therefore not a desirable latent thiol mercaptan chain transfer agent (see comparative example 4).

SUMMARY OF THE INVENTION

Latent thiol mercaptan chain transfer agents are compounds containing at least one thiol group and at least one protected thiol group. During use in a polymerization, the at least one thiol group reacts with a polymer chain being formed from at least one first ethylenically unsaturated monomer, yielding a polymer chain containing at least one protected thiol group, primarily at the terminal portion of the chain. This polymer formed can be used as is, or can react further. For example, the protected thiol group can be deprotected to yield a terminal thiol group on the polymer chain. These terminal thiol groups can then react with at least one second ethylenically unsaturated monomer, forming a block copolymer.

DETAILED DESCRIPTION OF THE INVENTION

Latent thiol mercaptan chain transfer agents are compounds containing at least one thiol group and at least one protected thiol group. Examples of latent thiol mercaptan chain transfer agents include compounds with the following structure;

where
A is a polyvalent organic radical;
x and y are positive integers such that x+y equals the valence of A;
B is an organic acyl radical; and
n and m are integers from 1 to 6.
It is more preferable that
A is a $C_1$ to $C_6$ hydrocarbon radical;
B is an acetyl or acetoacetyl group;
and n and m are 1 or 2.

Specific examples of latent thiol mercaptan chain transfer agents include; mono-, bis- and tris-S-acetyl-pentaerythritol tetra-3-mercaptopropionate; mono-, bis-, and tris-S-acetoacetyl-pentaerythritol tetra-3-mercaptopropionate; mono- and bis-S-acetoacetyltrimethylolpropane tri-3-mercaptopropionate; mono- and bis-S-acetyltrimethylolpropane tri-3-mercaptopropionate; 1-(S-acetyl-3-mercaptopropoxy)-3-mercapto-2-acetoxypropane; and 1-(S-acetyl-3-mercaptopropoxy)-3-mercapto-2-hydroxypropane.

When the latent thiol mercaptan chain transfer agent is bis-S-acetyl-pentaerythritol tetra-3-mercaptopropionate, it may be prepared by the esterification of pentaerythritol with 3-mercaptopropionic acid to yield the tetra ester containing four free thiol groups. Some of the thiol groups can then be converted to thioacetates by reacting the tetra ester with acetic anhydride. Although a statistical mixture of partially acetylated thiols is obtained, the mono-, di-, and tri-acetylated materials act equivalently under the reaction conditions. If two or more free thiols are present in the same molecule, they undergo intramolecular chain transfer and therefore behave grossly like a monothiol. A similar procedure can be followed for bis-S-acetyl-trimethylolpropane tri-3-mercaptopropionate, except the pentaerythritol is replaced with trimethylolpropane.

In the preparation of 1-(S-acetyl-3-mercaptopropoxy)-3-mercapto-2-hydroxypropane, thiolacetic acid is reacted with allyl glycidyl ether, in the presence of t-butylhydroperoxide, to yield a thioacetate epoxide. Additional thiolacetic acid is then reacted with the epoxide, in the presence of a base catalyst, to yield a bis-thioacetate. The bis-thioacetate can be treated with acid or base, preferably ammonia, triethylamine or p-toluenesulfonic acid and even more preferably p-toluenesulfonic acid to yield the product. The thioacetate adjacent to the hydroxyl group is more labile and is cleaved selectively.

These latent thiol mercaptan chain transfer agents can be used in all types of reactions where the use of chain transfer agents is well known to those skilled in the art, for example in solution or emulsion polymerizations.

To form the block copolymers of the present invention, it is preferable to use a two stage aqueous emulsion polymerization. In the first stage, the latent thiol mercaptan chain transfer agent is contained in the aqueous emulsion polymerization at a concentration up to about 10 mole percent, more preferably up to about 5 mole percent and even more preferably up to about 2 mole percent.

During this first stage, the at least one thiol group reacts with a polymer chain being formed from at least one first ethylenically unsaturated monomer to form a polymer chain containing at least one protected thiol group, primarily at the terminal portion of the chain.

The ethylenically unsaturated monomer useful in the first stage for the preparation of the block copolymer can be any ethylenically unsaturated monomer, for example; acrylate esters and acids; methacrylate esters and acids; acrylonitrile; methacrylonitrile; acrolein; methacrolein; vinyl aromatic compounds such as styrene, substituted styrene, vinyl pyridine and vinyl naphthalene; vinyl esters of organic acids, such as vinyl acetate; N-vinyl compounds such as N-vinyl pyrrolidone; unsaturated halogenated compounds such as vinyl chloride and vinylidene chloride; acrylamide, methacrylamide and substituted acrylamides and methacrylamides; polymerizable sulfonic acids and salts thereof such as styrene sulfonic acid, sodium vinyl sulfonate, sulfoethyl acrylate, sulfoethyl methacrylate and acryloamidopropanesulfonic acid (AMPS); vinyl ethers; or combinations thereof.

The emulsion polymerization should be run such that the protected thiol group from the latent thiol mercaptan chain transfer agent remains substantially intact during the first stage polymerization. In addition, it is preferable to run the first stage emulsion polymerization reaction in an inert atmosphere, for example, in a nitrogen atmosphere.

This polymer formed in stage one of the aqueous emulsion polymerization has, for example, the structure;

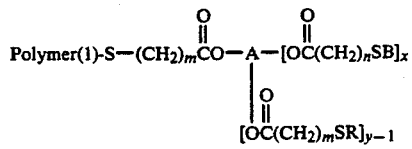

where polymer(1) is the polymer formed from the at least one first ethylenically unsaturated monomer and R is a segment of polymer(1) with a degree of polymerization of from about 1 to 10.

Once the polymer chain with terminal protected thiol groups has been formed in the first stage of the aqueous emulsion polymerization, the polymer can then be subjected to a deprotection reaction, for example a cleaving reaction or thermal heating, whereby the protected thiol groups (latent thiol groups) are deprotected, converting them into thiol groups.

When the protected thiol group of the polymer chains produced in the first stage emulsion polymerization are deprotected using a cleaving reaction, for example when the protected thiol group is thioacetate, any cleaving technique well known to those skilled in the art may be used. However, it is preferable to cleave the thioacetate group with, for example, ammonia, hydroxylamine, N-propylamine, diethylamine, morpholine, dimethylaminoethanol, and hydrazine. The more preferred cleaving agents are ammonia, dimethylaminoethanol and hydrazine and the even more preferred is hydrazine. Generally, the cleaving reaction is run at a temperature of from about 15° to 95° C. and more preferably from about 65° to 75° C.

It is more preferable to form a stage one polymer using a latent thiol mercaptan chain transfer agent where the thiol group is protected as the thioacetoacetate. This allows for the deprotection reaction to be accomplished with more innocuous compounds, for example with tertiary amine or alkali, and in addition leads to less toxic by-products from the deprotection reaction.

Once the protected thiol groups have been deprotected to form terminal thiol groups, the polymer chain produced in the first stage emulsion polymerization can be isolated, for example by spray drying, used as is, or stored for further reaction at a later time.

After the deprotection reaction the polymers formed have, for example, the following structure;

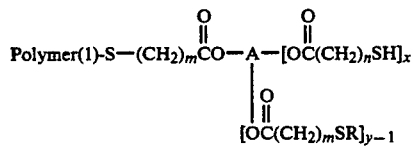

It is highly preferred that the second stage monomer emulsion be added directly to the polymer emulsion of stage one to form the block copolymer. One of the key advantages of this process is that the polymer of stage one does not have to be isolated before reacting in stage two, and stage two can take place simply by adding stage two monomer.

In stage two of the aqueous emulsion polymerization at least one second ethylenically unsaturated monomer, preferably in the form of an aqueous emulsion, is added to a reaction mixture containing the polymer chain formed during the first stage of the aqueous emulsion polymerization. Because the polymer chain from the first stage is a chain transfer agent containing terminal thiol groups, it is preferable to add all of the second stage monomer together at one time. However, if the second stage monomer is gradually added, some non-block copolymer may form, yielding a mixture of block copolymer and polymer derived from second stage monomer. This mixture may have some beneficial uses.

The at least one second ethylenically unsaturated monomer can be any of the ethylenically unsaturated monomers listed above for use as the at least one first ethylenically unsaturated first monomer.

The block copolymers formed after the second stage of the aqueous emulsion polymerization have, for example, the following structures;

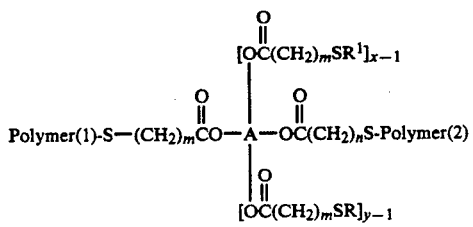

where polymer(2) is the polymer formed from the at least one second ethylenically unsaturated monomer and $R^1$ is a segment of polymer(2) with a degree of polymerization of from about 1 to 10.

The aqueous emulsion copolymerization technique of the present invention is based on a two stage polymerization where the mode of monomer addition in the first stage is not critical and a single addition of monomer in the second stage is preferred. The aqueous emulsion copolymerization techniques used in the present invention are well known to those skilled in the art. The temperature of the reaction in each of the two stages should be in the range of from about room temperature to about 150° C., more preferably from about 50° C. to 90° C.

An emulsifier can be used in the process of the present invention and can be of the general type of an anionic, cationic, or nonionic emulsifier. The more preferred emulsifiers are the anionic and the nonionic emulsifiers and the even more preferred are the anionic emulsifiers, such as sulfates and sulfonates, like sodium lauryl sulfate and sodium dodecyl benzene sulfonate. The amount of emulsifier used may be from about 0.05 to 10%, and more preferably from about 0.3 to 3%, based on the total weight of the monomers. Many other emulsifiers can be used and are well known in the emulsion polymerization art.

The latex particle size is controllable to be as small as from about 50 to 200 nanometers (nm) to as large as 800 nm or more by adjusting the type and level of emulsifier used. The particle size is preferably less than 500 nm.

It is advantageous to initiate and catalyze the reaction in each of the two stages in a conventional manner. Any commonly known free radical generating initiators can be used, such as persulfates, peroxides, hydroperoxides, peresters and azo compounds. Specific examples are benzoyl peroxide, tert-butyl hydroperoxide, azodiisobutyronitrile and sodium, potassium and ammonium persulfates. The more preferred are the sodium, potassium and ammonium persulfates which can be used by themselves, activated thermally, or in a redox system. When used in a redox system, reducing agents such as sodium formaldehyde sulfoxylate, isoascorbic acid and sodium bisulfite can be used along with a promoter, such as for example iron or others well known to those skilled in the art. Thermal initiation is more preferred. The amount of initiator will generally be in the range of from about 0.1 to 3.0% by weight, based on the total weight of the monomers.

The reaction conditions used in the second stage are dependant on the method of deprotection of the protected thiol group. For example, if a cleaving reaction utilizing ammonia is used to deprotect the protected thiol group, it is preferable to initiate the second stage polymerization thermally using ammonium persulfate or with redox initiators of tert-butylhydroperoxide and sodium formaldehyde sulfoxylate or isoascorbic acid. If hydroxylamine is used to deprotect the protected thiol group via a cleaving reaction, it is preferable to neutralize the amine with, for example, acetic acid, prior to the second stage polymerization. If hydrazine is used to cleave the protected thiol group, it is preferable to complex the hydrazine with 2,4-pentanedione prior to the stage two emulsion polymerization.

Additional initiator or catalyst systems may be added after stage two polymerization to reduce any residual monomer.

Generally, the aqueous emulsion formed containing the block copolymer has a solids level of from about 20 to about 60%, based on the total weight of the aqueous composition. The block copolymer products of this aqueous emulsion polymerization can be isolated, for example by spray drying, coagulation or other techniques well known to those skilled in the art. However, it is preferable to use the aqueous emulsion containing the copolymer as is.

The invention will now be illustrated by the following non-limiting examples.

EXAMPLES 1, 2 and 3: PREPARATION OF LATENT THIOL MERCAPTAN CHAIN TRANSFER AGENTS.

EXAMPLE 1

Preparation of a Mixture of
1-(S-acetyl-3-mercaptopropoxy)-3-mercapto-2-hydroxypropane and
1-(S-acetyl-3-mercaptopropoxy)-3-mercapto-2-acetoxypropane Step 1

TABLE 1

| Reagents for Example 1-Step 1 | | |
|---|---|---|
| Allyl glycidyl ether | 156 g. | 1.37 mole |
| Thiolacetic acid | 104 g. | 1.37 mole |
| t-Butylhydroperoxide | 10 g. | |

To a 1 liter 4-neck flask fitted with reflux condenser, thermocouple, and addition funnel was added allyl glycidyl ether (156 g). Thiolacetic acid was added in approximately 20 g. aliquots and each aliquot was initiated by the addition of 0.5 g. of a 70% t-butylhydroperoxide solution. An exotherm of between 10°–20° C. was observed for each aliquot, with care being taken to keep the reaction temperature below 65° C.

NMR analysis after the addition of one equivalent of thiolacetic acid showed 30–40% residual allyl glycidyl ether. Additional thiolacetic acid (40 g.) was then added in two portions, each portion initiated as above. NMR analysis showed >95% conversion of the allyl glycidyl ether.

Step 2

TABLE 2

| Reagents for Example 2-Step 2 | | |
|---|---|---|
| Thiolacetic acid | 104 g. | 1.37 mole |
| Triethylamine | 1.5 g. | |
| Ethanol | 250 g. | |

The reaction product described in step 1 was allowed to cool to room temperature and then was diluted with 250 g. of ethanol. Thiolacetic acid was added, followed by catalytic triethylamine. An exotherm from room temperature to approximately 60° C. over 1 hour was observed.

Step 3

A sample of the bis-thioacetate from step 2 was diluted with an equal volume of ethanol, and then 1% by weight p-toluenesulfonic acid (2 g.) was added. The mixture was heated to reflux for 4 hours.

NMR analysis showed complete transformation of the thioacetate adjacent to the hydroxyl group with the formation of two products; 1-(S-acetyl-3-mercapto-propoxy)-3-mercapto-2-hydroxypropane and 1-(S-acetyl-3-mercaptopropoxy)-3-mercapto-2-acetoxypropane

EXAMPLE 2

Preparation of Bis-S-acetyl-pentaerythritol tetra(3-mercaptopropionate)

TABLE 3

| Reagents for Example 2 | |
|---|---|
| Pentaerythritol tetramercaptopropionate | 50 g. |
| acetic anhydride | 20.89 g. |
| 4-dimethylaminopyridine (DMAP) | 0.1 g. |
| methylene chloride | 100 g. |

The tetraester was dissolved in methylene chloride containing DMAP. The acetic anhydride was added and a mild exotherm ensued. The mixture was heated to 40° C. for 1 hour. NMR analysis showed conversion to the desired partially protected chain transfer agent. Silver nitrate titration for mercaptan showed ca. 90% capping efficiency. The major product was bis-S-acetyl-pentaerythritol tetra(3-mercaptopropionate) along with lesser amounts of the mono- and tris-acetyl compounds.

EXAMPLE 3

Preparation of Pentaerythritol Tetramercaptopropionate Diacetoacetate.

To a solution of 20.0 g. (0.041 mol) of pentaerythritol tetramercaptopropionate in 20 g. of acetonitrile was added 7.9 g. (0.094 mol. 2.3 equiv.) of diketene. Upon addition of triethylamine catalyst (30 mg) an exotherm of 17° C. was observed. After 30 minutes the reaction mixture was warmed to 70° C. for an additional 30 minutes to ensure complete reaction. Solvent was removed on a rotary evaporator.

Silver nitrate titration for thiol showed 2.05 meq thiol/g material. The major product was bis-S-acetoacetyl-pentaerythritol tetra-3-mercaptopropionate along with lesser amounts of mono and tris-acetoacetyl compounds.

EXAMPLES 4 and 5: Emulsion Polymerization

EXAMPLE 4

Stage One

Preparation of emulsion copolymer of 99.5 parts Butyl acrylate/0.5 parts Methacrylic Acid with 2.24 weight percent based on the weight of the monomer of bis-S-acetyl pentaerythritol tetra-3-mercaptopropionate (degree of polymerization 200)

To a 5 liter 4-necked flask equipped with mechanical stirrer, reflux condenser, and thermometer was added 1080 g. of water and 14 g. of a 2.3% aqueous solution of sodium dodecylbenzenesulfonate and the mixture was warmed to 85° C. A monomer emulsion was prepared consisting of 400 g. of water, 20 g. of a 23% aqueous solution of sodium dodecylbenzenesulfonate, 1393 g. of butyl acrylate, 7 g. of methacrylic acid, and 31.35 g. of bis-S-acetyl pentaerythritol tetra-3-mercaptopropionate from Example 2.

A portion of the monomer emulsion (185 g.) was added to the flask at 85° C. followed by 2 g. of ammonium persulfate dissolved in 68 g. of water. After the initial exotherm subsided (5 minutes) the remainder of the monomer emulsion was fed into the flask at 85° C. over 2.5 hours. The mixture was maintained at 85° C. for an additional 30 minutes and then cooled to 60° C. t-Butylhydroperoxide (0.3 g. of a 70% solution) in 10 ml of water and 0.2 g. of sodium formaldehyde sulfoxylate were added to the flask. The theoretical yield was 47.4% solids, the actual yield was 47.2% solids.

Deprotection of Stage One Copolymer via a Cleavage Reaction

The stage one latex prepared above, 99.5 parts butyl acrylate/0.5 parts methacrylic acid with 2.24% of bis-S-acetyl pentaerythritol tetra-3-mercaptopropionate, 400 g. solids, was placed in a 3 liter, 4-necked flask (8.96 g. chain transfer agent, 0.031 mole latent thiol groups present). The apparatus was flushed with nitrogen. Hydrazine (2.0 g., 0.0625 mole, 2 equiv.) was added and the mixture was heated to 70° C. After two hours, silver nitrate titration of a 0.25 g. solids aliquot showed essentially quantitative liberation of thiol. Then, 2,4-pentanedione (6.88 g., 0.06875 mole) was added to complex with the hydrazine.

Stage Two

Emulsion polymerization of 50 parts (99.5 butyl acrylate/0.5 methacrylic acid with 2.24% bis-S-acetyl pentaerythritol tetra-3-mercaptopropionate)//50 parts Methyl Methacrylate.

Once deprotection was complete, the second stage monomer emulsion was prepared:
MMA 400 g.
dodecylbenzensulfonate (23%) 3 g.
water 500 g.

This emulsion was added to the latex and the temperature was allowed to return to 60° C. Ferrous sulfate/EDTA solutions (1 ml of 0.15% solution) were added and then a single shot polymerization was initiated by addition of 1.0 g of 70% t-butylhydroperoxide in 10 g. of water followed by 1.37 g. of isoascorbic acid in 10 g. of water. An exotherm of 25.5° C. was observed over a 15 minute period. The reaction was allowed to cool to 60° C. and then solutions of 0.3 g. of t-BHP/5 g. water and 0.3 g. of sodium formaldehyde sulfoxylate/5 g. water were added twice. The theoretical yield was 45.1% solids, the actual yield was 44.8% solids.

The MFT (minimum film forming temperature) of this block copolymer was found to be 3° C. A random copolymer of butyl acrylate and methyl methacrylate of the same composition and molecular weight had an MFT of 22° C.

EXAMPLE 5

Stage One

Preparation of emulsion copolymer of 99 parts Butyl Acrylate/1 part Methacrylic Acid with 2.57 weight percent based on the weight of the monomer of bis-S-acetoacetyl pentaerythritol tetra-3-mercaptopropionate (degree of polymerization 200).

To a 3-liter 4-necked flask equipped with mechanical stirrer, reflux condenser, and thermometer was added 570 g. of water and 7.0 g. of a 2.3% aqueous solution of sodium dodecylbenzenesulfonate and the mixture was warmed to 85° C. A monomer emulsion was prepared containing 200 g. water, 10 g. of a 23% aqueous solution of sodium dodecylbenzenesulfonate, 693 g. butyl acrylate, 7.0 g. methacrylic acid, and 18.0 g. bis-S-acetoacetyl pentaerythritol tetra-3-mercaptopropionate from Example 3.

A portion of the monomer emulsion (93 g.) was added to the flask at 85° C. followed by the addition of 1.0 g. of ammonium persulfate dissolved in 34 g. water. After the initial exotherm subsided (5 minutes), the remainder of the monomer emulsion was fed into the flask at 85° C. over 2.4 hours. The mixture was maintained at 85° C. for an additional 30 minutes and was then cooled to 60° C. t-Butylhydroperoxide (0.2 g. of a 70% solution) in 10 ml of water and 0.2 g. of sodium formaldehyde sulfoxylate in 10 ml of water were then added to the flask. The theoretical yield was 45.1% solids, the actual yields was 44.9% solids. The particle size was 284 nm.

Deprotection of Stage One Copolymer via a Cleavage Reaction

The stage one latex prepared above, 99 parts butyl acrylate/1 part methacrylic acid with 2.57% bis-S-acetoacetyl pentaerythritol tetra-3-mercaptopropionate, 100 g. solids, was placed in a 1 liter, 4-necked flask. The apparatus was flushed with nitrogen. Dimethylaminoethanol (1.51 g., 0.017 mol, 2 equiv.) was added and the mixture was heated to 70° C. After 1 hour, silver nitrate titration showed essentially quantitative liberation of thiol. Aerosol ® A-103 surfactant (3.0 g. of 33% aqueous solution) was added and the mixture was acidified to pH 7.8 using 15% aqueous acetic acid.

Stage Two

Emulsion polymerization of 50 parts (99 parts butyl acrylate/1 part methacrylic acid with 2.57% bis-S-acetoacetyl pentaerythritol tetra-3-mercaptopropionate)//50 parts methyl methacrylate.

Once deprotection was complete, the second stage monomer emulsion was prepared:
MMA 100 g.
dodecylbenzenesulfonate (23%) 0.6 g.
water 135 g.

This emulsion was added to the latex in one portion and the temperature was allowed to return to 60° C. Ferrous sulfate/EDTA solutions (2 ml of 0.15% solution) were added and then a single shot polymerization was initiated by the addition of 0.5 g. of 70% t-butylhydroperoxide in 10 ml of water followed by 0.7 g. of isoascorbic acid in 10 ml of water. An exotherm of 21° C. was observed over a 12 minute period. The reaction mixture was allowed to cool to 60° C. and then solutions of 0.2 g. of t-BHP/10 g. water and 0.2 g sodium formaldehyde sulfoxylate/10 g. water were added. The theoretical yield was 40.0% solids and the actual yield was 39.7% solids. The particle size was 358 nm.

EXAMPLE 6-COMPARATIVE

The use of thiolacetic acid as a chain transfer agent was evaluated. Comparative data can be seen in Table 4, showing that, at a given concentration the thiolacetic acid is less effective in controlling molecular weight. Thiolacetic acid has been found to form significant amounts of mono-adducts with acrylate monomers. Upon deprotection, this material yields low molecular weight thiol which is unattached to polymer and therefore results in reduced yields of block copolymer.

TABLE 4

| Comparison of Chain Transfer Agents | | |
|---|---|---|
| Chain Transfer Agent* | Theoretical Mn | Experimental Mn |
| 1. thiolacetic acid | 3650 | 3260 |
| 2. thiolacetic acid | 1440 | 3540 |
| 3. thiolacetic acid | 720 | 4360 |
| 4. thiolacetic acid | 1440 | 5100 |
| 5. thiolacetic acid | 3650 | 5650 |
| 6. thiolacetic acid | 1500 | 2605 |
| 7. thiolacetic acid | 4500 | 8300 |
| 8. butyl mercaptopropionate | 4500 | 4390 |
| 9. thiolacetic acid | 2500 | >10,000 |
| 10. thiobenzoic acid | 2500 | 7500 |
| 11. butyl mercaptopropionate | 2500 | 2870 |
| 12. thiolacetic acid | 10,000 | 17,500 |
| 13. butyl mercaptopropionate | 10,000 | 10,200 |

*1-3 Solution polymerization of acrylic acid in isopropanol.
4-5 Solution polymerization of acrylic acid in n-propanol.
6-8 Solution polymerization of methyl methacrylate in toluene.
9-11 Emulsion polymerization of ethyl acrylate.
12-13 Emulsion polymerization of butyl acrylate/methyl methacrylate.

We claim:

1. A latent thiol mercaptan chain transfer agent having the general formula;

wherein
A is a polyvalent organic radical;
x and y are positive integers such that x+y equals the valence of A;
B is an organic acyl radical; and
n and m are integers from 1 to 6.

2. The latent thiol mercaptan chain transfer agent of claim 1 wherein
A is a $C_1$ to $C_6$ hydrocarbon radical;
B is an acetyl or acetoacetyl group;
and n and m are positive integers from 1 to 2.

3. A latent thiol mercaptan chain transfer agent selected from the group consisting of; mono-, bis- and tris-S-acetyl-pentaerythritol tetra-3-mercaptopropionate; mono-, bis-, and tris-S-acetoacetyl-pentaerythritol tetra-3-mercaptopropionate; mono- and bis-S-acetoacetyltrimethylolpropane tri-3-mercaptopropionate; mono- and bis-S-acetyltrimethylolpropane tri-3-mercaptopropionate; 1-(S-acetyl-3-mercaptopropoxy)-3-mercapto-2-acetoxypropane; and 1-(S-acetyl-3-mercaptopropoxy)-3-mercapto-2-hydroxypropane.

* * * * *

UNITED STATES PATENT AND TRADEMARK OFFICE
CERTIFICATE OF CORRECTION

PATENT NO. : 5,294,728
DATED : March 15, 1994
INVENTOR(S) : William D. Emmons, Andrew W. Gross It is certified that error appears in the above-identified patent and that said Letters Patent is hereby corrected as shown below:

Column 2, line 9
    reads "(see comparative example 4)"
    should read ---(see comparative example 6, Table 4).---

Signed and Sealed this

Eleventh Day of October, 1994

Attest:

BRUCE LEHMAN

*Attesting Officer*  *Commissioner of Patents and Trademarks*